No. 743,356. PATENTED NOV. 3, 1903.
C. H. WATTERS.
VALVE DEVICE.
APPLICATION FILED MAR. 17, 1903.
NO MODEL. 3 SHEETS—SHEET 1.
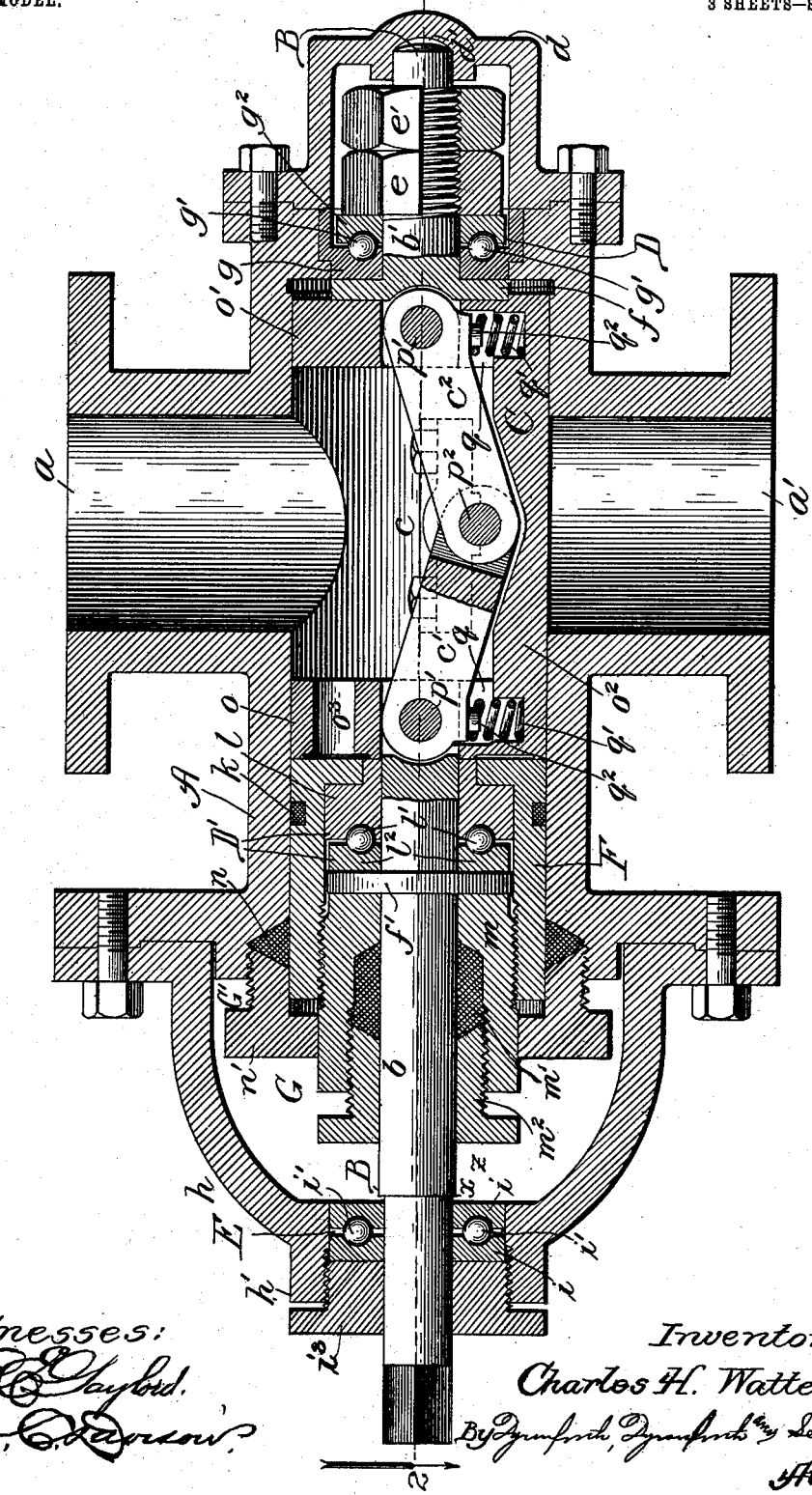
Witnesses: Inventor:
Charles H. Watters.

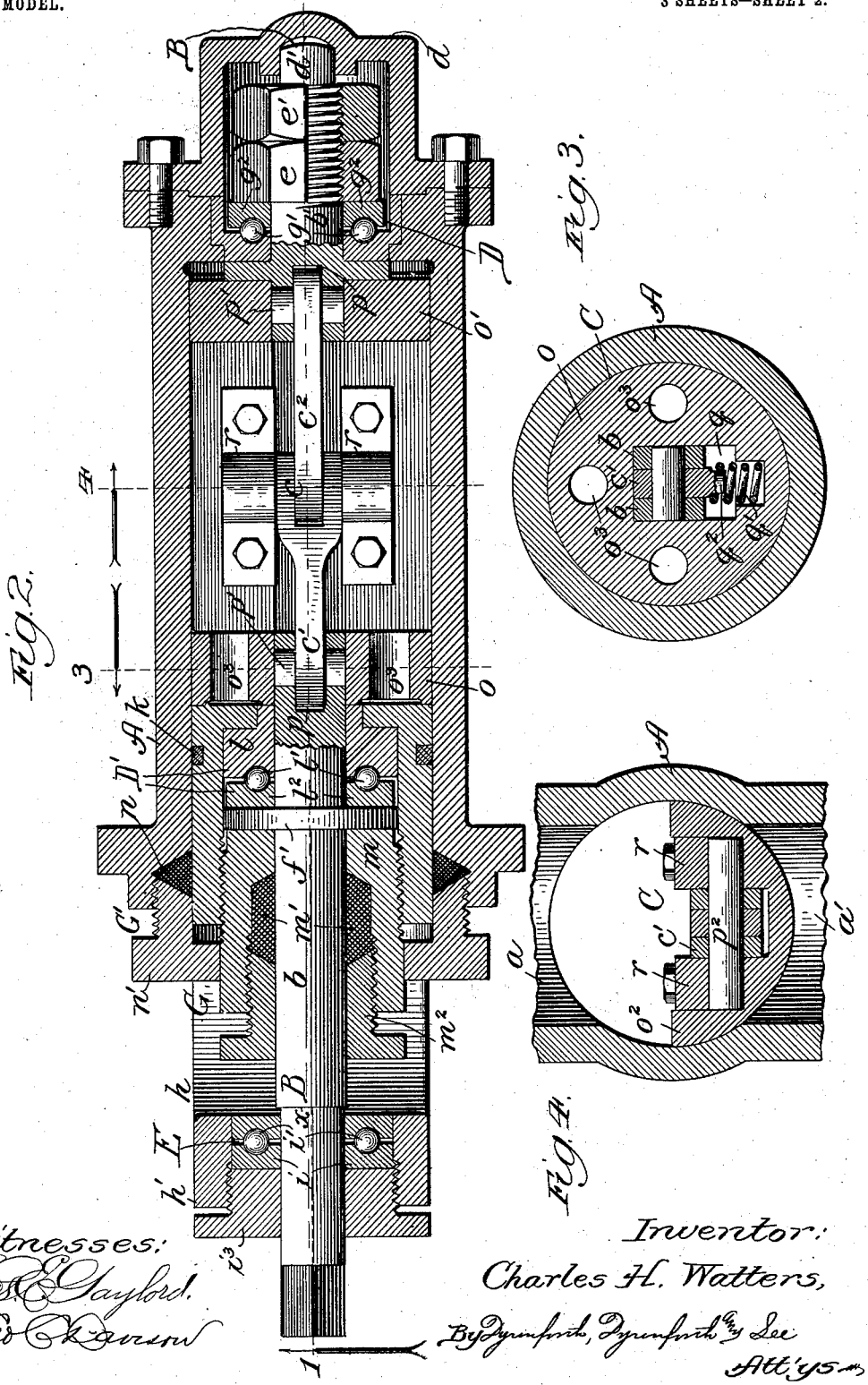

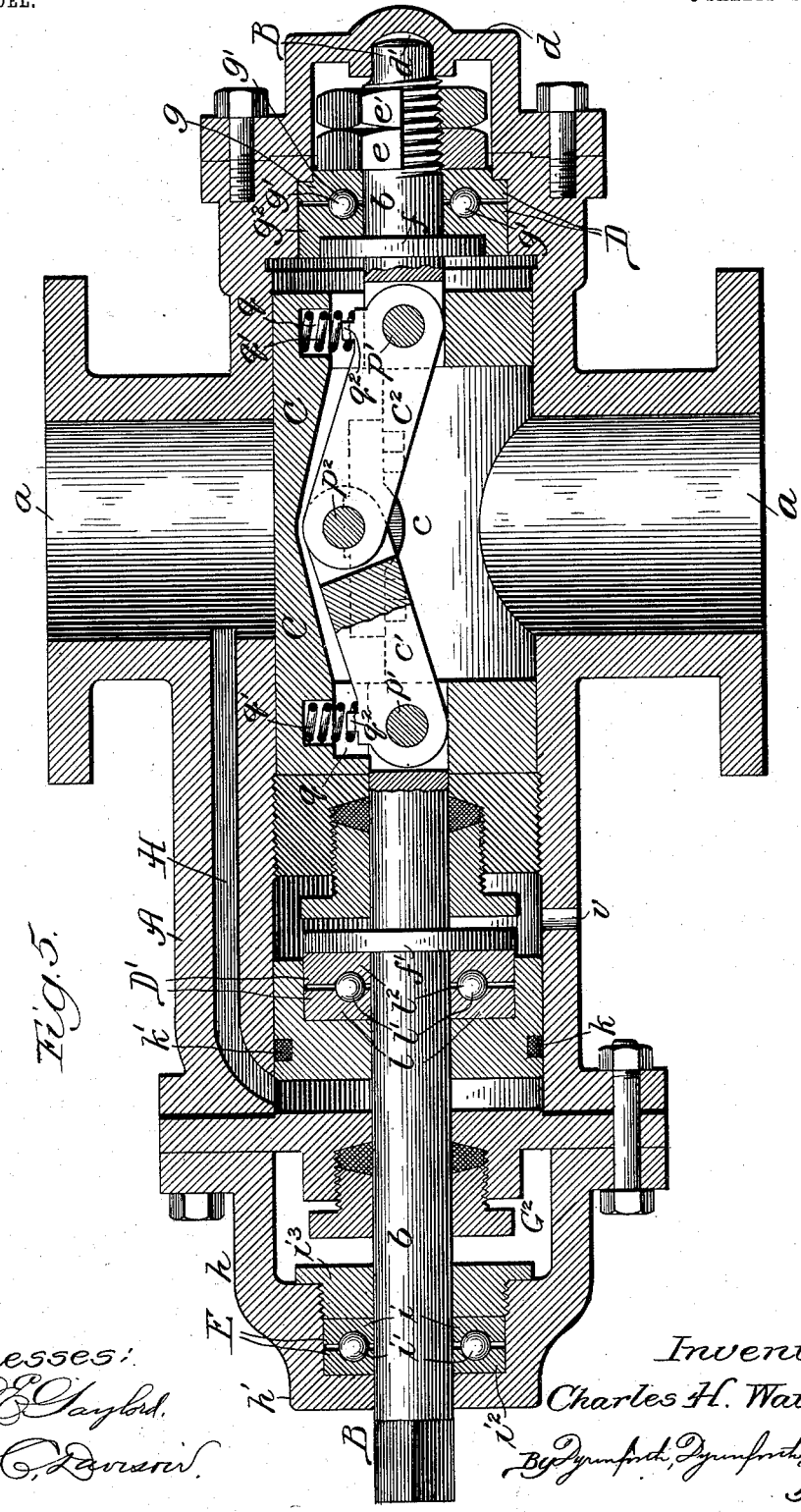

No. 743,356. Patented November 3, 1903.

UNITED STATES PATENT OFFICE.

CHARLES H. WATTERS, OF CHICAGO, ILLINOIS.

VALVE DEVICE.

SPECIFICATION forming part of Letters Patent No. 743,356, dated November 3, 1903.

Application filed March 17, 1903. Serial No. 148,221. (No model.)

*To all whom it may concern:*

Be it known that I, CHARLES H. WATTERS, a citizen of the United States, residing at 1097 West Taylor street, Chicago, in the county of Cook and State of Illinois, have invented a new and useful Improvement in Valve Devices, of which the following is a specification.

My invention is in the nature of an improvement upon the valve device for which Letters Patent of the United States No. 519,052 were granted to me May 1, 1894, and which involves a construction whereby the pressure against the valve shall operate so to reduce its frictional contact with the surface against which it bears as to facilitate the operation of turning it.

My present object is to provide a novel and improved construction of valve device operating on the principle thus outlined.

Referring to the accompanying drawings, Figure 1 is a longitudinal section of my improved valve device, taken at the line 1 on Fig. 2 and viewed in the direction of the arrow; Fig. 2, a section taken at the line 2 on Fig. 1 and viewed in the direction of the arrow; Fig. 3, a section taken at the line 3 on Fig. 2 and viewed in the direction of the arrow; Fig. 4, a section taken at the line 4 on Fig. 2 and viewed in the direction of the arrow; and Fig. 5, a view like that presented by Fig. 1, but with the valve and other parts inverted and showing a modification.

A is the casing, shown of general cylindrical form, with flanged inlet and discharge ports $a$ and $a'$, extending at right angles to it, between its ends.

B is the rotary valve-stem, comprising the end sections $b$ and $b'$, connected by a toggle-joint $c$, having the adjacent ends of its lever members $c'$ and $c^2$ journaled to the valve C at its transverse center, the valve seating against the discharge-port $a'$.

On one flanged end of the casing is bolted at its flange a cap $d$, containing a bearing $d'$ for the stem-section $b'$, which is shown threaded for receiving a nut $e$ and a jam-nut $e'$ and as provided with a flange $f$, abutting against the member $g$ of a ball-bearing D, stationarily shouldered into the casing and forming a race for the balls $g'$ with the rotary member $g^2$ of the bearing, against which the nut $e$ bears to confine the balls. On the opposite flanged end of the casing is bolted a bracket $h$, having an internally-threaded end socket $h'$, containing a bearing for the stem-section $b$, comprising the respectively stationary and rotatory members $i$ and $i^2$ of a ball-bearing E, forming a race between them for the balls $i'$, confined by a gland $i^3$, screwed into the socket against the member $i$.

F is a piston fitting within the casing, with an interposed circumferential packing-ring $k$ let into it near one open end, which is closed by a member $l$, immovably confined in it, of a ball-bearing D' for the stem-section $b$, which carries a circumferential flange $f'$, abutting against the rotatory member $l^2$ of the ball-bearing, forming with the member $l$ a race for the balls $l'$. A stuffing-box G is provided in the outer open end of the hollow piston and, as shown in Figs. 1 and 2, comprises an externally and internally threaded cup $m$, screwing into the piston about the stem-section to abut against the flange $f'$ and containing packing $m'$, against which a gland $m^2$ is screwed. Another stuffing-box G' is shown in Figs. 1 and 2 to be formed on the casing about the piston by means of packing $n$ and a gland $n'$, screwed against it into the casing-tank.

The valve C, as shown, is formed with cylindrical heads $o$ and $o'$, fitting rotatably within the casing and connected by a solid body $o^2$ of general semicylindrical shape in cross-section. The head $o$, which is adjacent to the piston, is provided with apertures $o^3$ to permit through them access of the fluid-pressure to the piston-surface, for the purpose hereinafter described. The toggle members $c'$ and $c^2$ fit at their outer ends into recesses $p\,p$, provided to receive them, respectively, in the inner ends of the valve-stem end sections, wherein they are pivoted on pins $p'$, passing through the recesses. The inner ends of the toggle-joint members are journaled, as clearly shown in Fig. 2, on a pin $p^2$, held at its opposite ends in bearings $r\,r$, bolted to the face of the valve-body between its heads in depressions at opposite sides of its longitudinal center, which is still further depressed to incline to the transverse center of the valve-body, as represented in Figs. 1 and 4, in conformance to the normal inclinations of the toggle members. In each head $o\,o'$ of the valve is provided a socket $q$, containing a spring $q'$, which engages with a stud $q^2$, depending from the outer journaled end of each toggle member for the purpose of tending to maintain the normally inclined relation of such members. The surface area of the face of the piston F may about equal or somewhat exceed that of the surface of the valve which is exposed to the pressure. The more acute the angle at which the toggle members extend the smaller may be the area of the piston-face relative to that of the valve, since the greater the angularity of the toggle the greater the leverage of the piston on the valve. The pressure entering the part $a$ is exerted against the valve and tends to bind it against its seat, and thus to render turning it a matter of difficulty. This binding tendency is counteracted by the outward exertion of the pressure against the face of the piston F, which, according to the construction illustrated in Figs. 1 and 2, is capable of yielding to the extent of the space between a shoulder $x$ on the stem-section $b$ and the adjacent member $i^2$ of the ball-bearing E. The outward movement of the piston under the fluid-pressure against it tends to straighten the members of the toggle-joint $c$, whereby the valve is withdrawn from undue frictional contact with the casing-wall and may without shutting off or reducing the pressure be easily turned by turning the stem B, which operation is still further facilitated by the provision of the described ball-bearings in which it is supported.

In the construction of the valve device illustrated in Figs. 1 to 4, inclusive, the valve seats against the port $a'$ with the pressure entering the port $a$. By the construction illustrated in Fig. 5, which differs only slightly in detail from that disclosed in the preceding figures of the drawings, the valve is caused to seat against pressure introduced at the port $a$. For this purpose the valve C is inverted, seating against the inlet-port, from which a by-passage H leads behind the piston F to tend to force it in the direction to bend the toggle-joint $c$, and thus force the valve against its seat, while the pressure against the valve through the port $a$ tends to force it from its seat with the same resultant effect of reducing the friction of the valve to facilitate turning it, as has already been described. In this construction of the device the members of the ball-bearing D are reversed, as are also those of the ball-bearing D', which, moreover, is at the other side of the flange $f'$, while the piston is surrounded near its outer end by a packing-ring $k'$, and the stuffing-box G' may be omitted, and only one stuffing-box $G^2$, practically like that shown at G, is shown at the end of the casing, while the members of the bearing E in the socket end of the bracket $h$ are reversed, and no shoulder $x$ is required on the stem-section $b$. A vent-port $v$ is shown to open the casing to the atmosphere.

What I claim as new, and desire to secure by Letters Patent, is—

1. In a valve device, the combination with a casing having an inlet-port and a discharge-port, of a rotatable valve in the casing seating against one of said ports and comprising a body provided with heads at its opposite ends, a rotatable valve-stem in said casing formed of end sections and an intermediate toggle-joint section pivotally connecting said end sections with the valve-body, ball-bearings in the valve-casing for the end sections of the valve-stem, and a non-rotatable piston on one of said end sections adjacent to a valve-head and exposed to the pressure from said inlet-port.

2. In a valve device, the combination with a cylindrical casing having an inlet-port and a discharge-port, of a rotatable valve in the casing comprising a semicylindrical body provided at its opposite ends with cylindrical heads and seating against one of said ports, a rotatable valve-stem in said casing formed of end sections and an intermediate toggle-joint section having its members pivotally connected at their outer ends with the inner ends of said end sections and at their inner ends with the valve-body near its center, ball-bearings in the valve-casing for the end sections of the valve-stem, a piston on one of said end sections adjacent to a valve-head and exposed to the pressure from said inlet-port, and springs confined against said toggle-joint members near their outer ends.

3. In a valve device, the combination with a casing having an inlet-port and a discharge-port, of a rotatable valve in the casing seating against said inlet-port, a rotatable valve-stem in said casing formed of end sections and an intermediate toggle-joint section pivotally connecting said end sections with the valve, a piston on one of said end sections, and a by-passage leading from the inlet-port behind said piston.

4. In a valve device, the combination with a casing having an inlet-port and a discharge-port, of a rotatable valve in the casing seating against said inlet-port and comprising a body provided with heads at its opposite ends, a rotatable valve-stem in said casing formed of end sections and an intermediate toggle-joint section pivotally connecting said end sections with the valve-body, ball-bearings in the valve-casing for the end sections of the valve-stem, a non-rotatable piston on one of said end sections adjacent to a valve-head and exposed to the pressure from said inlet-port, and a by-passage leading from the inlet-port behind said piston.

5. A valve device comprising, in combination, a cylindrical casing having an inlet-port and a discharge-port, and provided on one end with a cap and at its opposite end with a stuffing-box, a bracket extending from said stuffing-box end of the casing containing a ball-bearing, a rotatable valve in the casing comprising a central body provided at its opposite ends with heads and seating against one of said ports, a rotatable valve-stem formed of a flanged end section journaled in said ball-bearing at its outer end and provided with a ball-bearing near its inner end, a flanged end section provided with a ball-bearing near its inner end and journaled at its outer end in said cap, and an intermediate toggle-joint section pivotally connecting said end sections with the valve-body, a hollow piston in the casing surrounding one of said end sections and the ball-bearing thereon near its inner end, and exposed to the pressure from said inlet-port, and springs confined against the outer pivotal ends of the members of said toggle-joint section of the valve-stem.

CHARLES H. WATTERS.

In presence of—
WALTER N. WINBERG,
L. HEISLAR.